June 12, 1951     C. S. CRAFTS     2,556,678
POSITIVE CLUTCH AND LOCK
Filed March 1, 1945
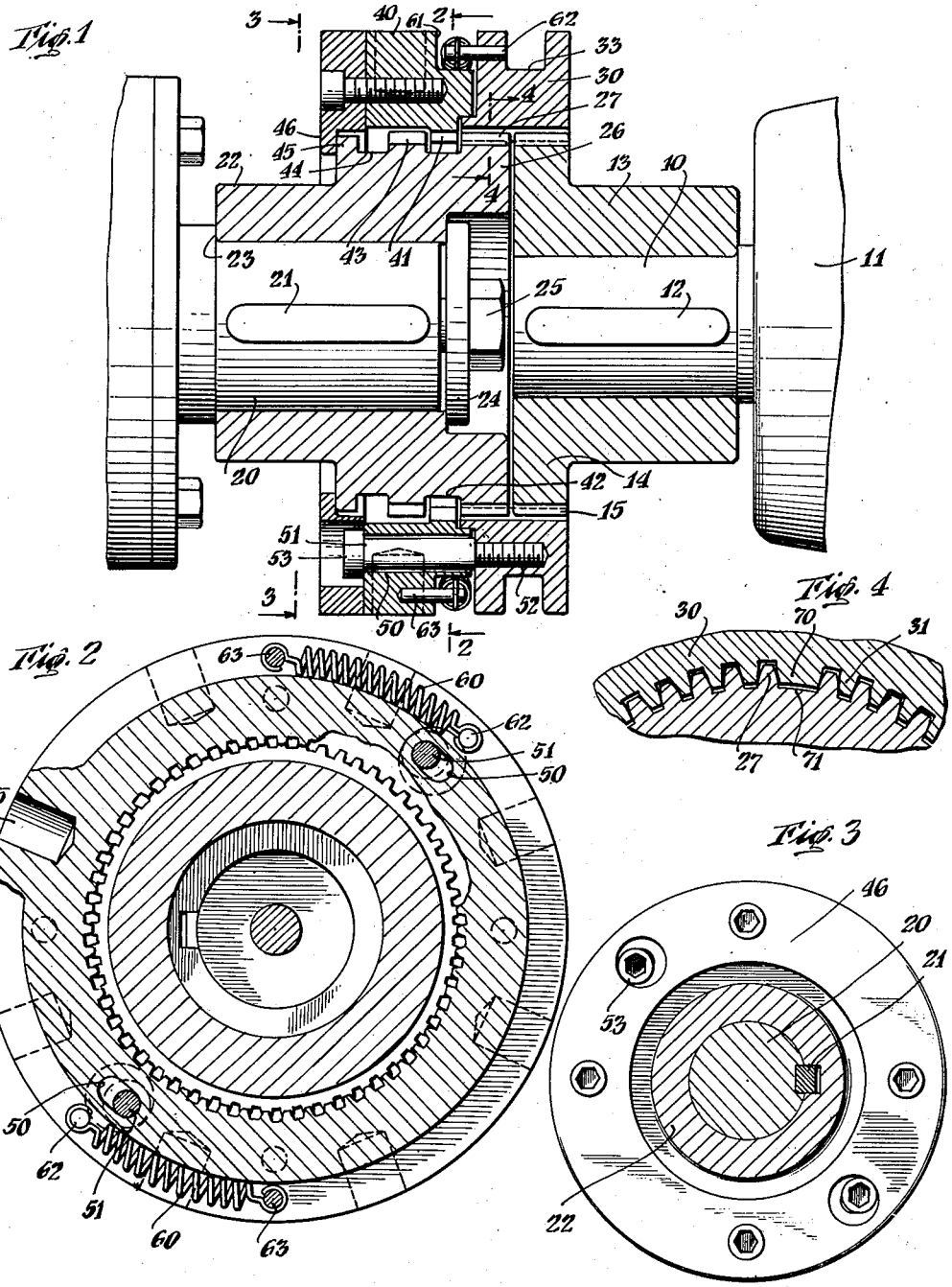
INVENTOR.
Curtis S. Crafts
BY
Hobart N. Durham
Attorney Patented June 12, 1951

2,556,678

UNITED STATES PATENT OFFICE 2,556,678

POSITIVE CLUTCH AND LOCK

Curtis S. Crafts, Oak Park, Ill., assignor to The Goss Printing Press Company, Chicago, Ill., a corporation of Illinois Application March 1, 1945, Serial No. 580,344

10 Claims. (Cl. 192—114)

The invention relates to improvements in clutches and more particularly to a novel and useful clutch assembly construction for the drive of printing presses.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Fig. 1 is a longitudinal section of a mechanism embodying the invention;

Fig. 2 is a transverse section taken on line 2—2 of Fig. 1;

Fig. 3 is a transverse section taken on line 3—3 of Fig. 1; and

Fig. 4 is an enlarged detail, in transverse section, on line 4—4 of Fig. 1.

The primary object of the invention is to provide a novel driving clutch construction, particularly useful in the main drive of a printing press, but not limited to such use, said clutch being provided with novel means for effecting a positive lock of the coupled parts in driving position and also a similar positive lock when the clutch is in the uncoupled or silencing position.

The invention is shown as applied to a gear type coupling or clutch having an internal or ring gear connecting two spur gears of equal numbers of teeth and diametral pitch. However, in its broader aspects the invention is applicable and intended to cover other types of clutches embodying the broad principle of locking referred to above and as such is applicable for example to the tongue and key type of clutch designed for reversible drives, as specifically disclosed in my copending improvement application, filed as of even date herewith, Serial No. 580,345, now Patent Number 2,493,059, issued January 3, 1950. In the present preferred form of the invention herein disclosed, the internal gear which connects the driving and driven gears is axially slidable lengthwise of the driving and driven shafts so as to couple and uncouple said spur gears. In the coupled position, the internal gear is held locked from axial uncoupling movement by means of a toothed locking ring which is rotatable relatively to said internal gear and by such rotation interlocks by matching alinement with a set of teeth on the driven gear so as to block the internal gear from axial sliding or uncoupling movement. Said locking ring is urged toward and held in locking position by spring means. When it is desired to unlock same to permit uncoupling of the clutch, the locking ring may be rotated against the spring to move its teeth out of alinement with said teeth on the spur gear, whereupon the internal gear, with the locking ring, may be slid to the uncoupled position. Thereupon the locking ring turns sufficiently to block the internal gear from returning to the coupling position until the locking ring is again turned to free the internal gear for coupling movement.

It will be understood that the foregoing general description of the invention and the following detailed description as well are illustrative and explanatory of the invention but are not restrictive thereof.

Referring now in detail to the present preferred embodiment of the invention, illustrated by way of example in the accompanying drawings, a driving shaft 10 is shown projecting from motor 11, said shaft being keyed by key 12 to a spur gear 13 sleeved thereon. The flanged portion 14 of said spur gear is provided with gear teeth 15 as shown.

A driven shaft 20, which in the present preferred application of the invention may be considered as the unit drive shaft of a newspaper printing press, is fixed, by key 21, to a driven spur gear 22. Said gear is fixed against axial sliding movement along shaft 20 by means of shoulder 23 on the shaft and, at the end of the shaft by washer 24 which is held in place by threaded bolt 25 tapped into the end of the shaft. The spur gear 22 is cupped at its corresponding end to receive the washer 24, the flanged end portion 26 of said gear projecting beyond the end of the shaft to face the adjacent flange portion 14 of driving gear 13. The portion 26 of gear 22 is provided with teeth 27 which are the same in number and diametral pitch as the teeth 15 of drive gear 13.

An internal or ring gear 30 for coupling and uncoupling the driving and driven gears is positioned to surround same and is provided with gear teeth 31 which mesh with the teeth 27 of the driven gear and the teeth 15 of the drive gear. In order to effect the desired sliding or axial movement of the ring gear 30 for coupling and uncoupling said spur gears, same is designed to be movable axially of the shafts 10 and 20 and for such purpose the perimeter of said gear 30 may be provided with an annular groove 33 to effect such movement by a special tool or clutch ring (not shown).

In accordance with the invention, a locking ring 40 is provided for positively restraining the ring gear 30 from axial uncoupling movement. For this purpose, the ring 40, which is generally of the same external and internal diameters as the ring gear 30, is axially slidable with said ring gear and is designed to have limited rotary or angular motion with respect to said ring gear 30 about their common axis. The locking ring 40 is provided with internal gear teeth 41 which are equal in number and circular pitch to the teeth 31 of ring gear 30. When the ring gear is in the driving or coupled position, as shown in Fig. 1, said teeth 41 of the locking ring 40 are positioned to lie within an annular locking groove 42 formed in the periphery of the driven gear 22 adjacent (to the left) the spur teeth 27 thereof (Fig. 1). To the rear or left of said groove 42, the spur gear 22 is provided with a second set of spur teeth 43 which are equal in number and pitch to the driven teeth 27 thereof. Another annular locking groove 44 is provided in the enlarged portion of said spur gear 22 to the left of the teeth 43, said groove being similar in dimensions to that of the groove 41 previously described. Finally, to the left of groove 44 is provided an upstanding shoulder portion 45 against the rear face of which a flange 46 on the ring 40 is adapted to rest.

In accordance with the invention, spring means are provided for rotating the locking ring 40 a limited distance relative to the ring gear 30 so that when the teeth 41 of the locking ring are positioned in groove 42 as shown, the assembled ring gear 30 and locking ring 40 will be blocked from movement to the left, that is uncoupling movement, by the overlapping, matching alinement thereby set up between said teeth 41 and teeth 43 of the driven spur gear, and between the teeth of the ring gear and said teeth 41 (Fig. 2). For this purpose two axial arcuate slots 50 are cut through the ring 40. The angular movement of the ring 40 with respect to the ring gear 30 is constrained by means of studs 51, which are tapped into threaded bores 52 in the ring gear and extend axially through the slots 50, being provided with heads 53 at their opposite ends. The relation between the slots 50 and the studs 51 is such that the ring 40 may be turned so as to displace the teeth 41 one-half circular pitch with respect to the teeth 31 of the ring gear and similarly with respect to the teeth 43 of the spur gear 22. When so displaced, as indicated in Fig. 2, the teeth 41 are alined in opposed matching relationship with teeth 43 and thus provide a positive lock against uncoupling movement on the part of the ring gear 30.

The embodied means for urging the ring 40 into said locking position comprises two helical springs 60 which lie in the cut-out portion 61 of ring 40 adjacent the face of ring gear 30. One end of each such springs is fixed to the ring gear 30 by means of studs 62, the opposite ends thereof being similarly fixed by studs 63 to the adjacent shoulder of the locking ring 40. The effect of said springs is to urge the ring 40 to turn as shown into the locking or out-of-mesh position.

When it is desired to uncouple the clutch, the locking ring 40 is rotated against the pull of the springs 60 to the other limit of the slots 50, thereby bringing the gear teeth 41 out of alinement with teeth 31 and teeth 43 and into matching relationship with the spaces between said teeth. In this position the ring gear 30 and ring 40 may be slid to the left to uncouple the clutch. When in the latter or uncoupled position, the teeth 41 will then lie within the groove 44 of gear 22 and, upon release of the ring 40, same will snap back into the alined, blocking position, thereby locking the clutch assembly against return or coupling movement, so that said clutch remains locked in the uncoupled or silencing position until it is again positively returned by turning the locking ring to the movement-permitting relation as aforesaid. For the purpose of so turning the locking ring, its periphery is preferably provided with a plurality of radially-disposed sockets 65 for the insertion of a pin or other suitable tool.

It will be noted that gear 30 is provided with one double width tooth 70 and gears 26 and 13 are provided with corresponding double width gaps 71. This arrangement insures that said gears can mesh in only one position, thereby retaining the correct timing between printing units.

The invention in its broader aspects is not limited to the specific mechanisms shown and described but departures may be made therefrom within the scope of the accompanying claims without departing from the principles of the invention and without sacrificing its chief advantages.

What I claim is:

1. In a clutch, in combination, a driving spur gearlike member, a driven spur gearlike member having the same pitch diameter and number of teeth, an internally toothed clutch member meshing with both said spur gearlike members, said internally toothed clutch member being axially movable with respect to the spur gearlike members to an uncoupled position, and means for locking the internally toothed clutch member in both the driving and uncoupled positions, said locking means including an internally toothed ring co-axial with said internally toothed clutch member and a third spur gearlike member fixed to and axially spaced from said driven gearlike member, said ring being angularly movable with respect to said third spur gearlike member so as to lock thereagainst when teeth of said ring gear are alined therewith and to permit axial unlocking movement when said teeth are moved out of alinement therewith.

2. In a clutch, in combination, a driving spur gearlike member, a driven member having a driven spur gearlike element and a locking spur gearlike element axially spaced thereon, said two spur gearlike elements on said driven member having the same pitch diameter and number of teeth as the driving gearlike member, an internally toothed clutch meshing with the driving gearlike member and said driven spur gearlike element, said clutch being movable axially along the driven member to disengage from the driving gearlike member and a toothed locking ring movable axially with the clutch and having angular movement relatively thereto, the teeth of said locking ring being movable into and out of meshing alinement with the teeth of the locking spur gearlike element to permit movement of the locking ring along the driven member to positions adjacent either face of said locking spur gearlike element, and means for urging the locking ring out of said meshing alinement when positioned adjacent either face of the locking spur gearlike element.

3. In a clutch, in combination, a driving gearlike member, a driven gearlike member, a clutch axially movable from a driving position where it engages the teeth of both of said members to an uncoupled position, blocking means associated with one of said members, and locking means axially movable with said clutch into and between both of said positions, said locking means being relatively coaxially rotatable with respect to said clutch to engage said blocking means in either of said positions preventing axial movement of said clutch.

4. In a clutch, in combination, a driving gearlike member, a driven gearlike member, a clutch axially movable from a driving position where it engages the teeth of both of said members to an uncoupled position, blocking means associated with one of said members, and locking means axially movable with said clutch and automatically movable through coaxial rotary motion with respect thereto to engage said blocking means in either of said positions preventing axial movement of said clutch, said locking means being manually movable through coaxial rotary motion with respect to said clutch to disengage said blocking means permitting axial movement of said clutch.

5. In a clutch, in combination, a driving member, a driven member having an axis parallel to the driving member, an axially movable clutch movable from a driving position to an uncoupled position, blocking means associated with one of said members, and locking means axially movable with said clutch and spring urged for rotary movement with respect thereto to engage said blocking means preventing axial movement of said clutch and locking means, said locking means being relatively rotatable with respect to said clutch against said spring urged action to disengage said blocking means and permit axial movement of said clutch and locking means.

6. In a clutch, in combination, a driving member, a coaxial driven member, a coaxial clutch axially movable from a driving position to an uncoupled position, a coaxial locking means axially movable with said clutch and spring-urged for rotary movement with respect thereto into locking relation for locking the clutch in either of said positions, and blocking means associated with one of said members engageable by said locking means in either of said positions, said locking means being manually movable in rotary movement with respect to said clutch to disengage said blocking means to permit coupling and uncoupling of said members and clutch.

7. In a clutch, in combination, a driving gear, a driven gear, a toothed clutch member axially movable with respect to the driven gear from a driving position to an uncoupled position, a toothed locking member movable in rotary motion into and out of alined relationship with said clutch member and axially movable therewith for locking the clutch member in either of said positions and blocking means associated with one of said gears engageable by said locking member in either of said positions.

8. In a clutch, in combination, a driving gear, a driven gear, a toothed clutch member axially movable from a driving position to an uncoupled position, a toothed locking member rotatable into and out of opposed, matching relationship with said clutch member and axially movable therewith for locking the clutch member in either of said positions and blocking means associated with one of said gears engageable by said locking member in either of said positions.

9. In a clutch, in combination, a driving gear, a driven gear, a toothed clutch member axially movable from a driving position to an uncoupled position, a toothed locking member movable in rotary motion into and out of alined relationship with said clutch member for locking the clutch member in either of said positions, blocking means associated with one of said gears engageable by said locking member in either of said positions and spring-urged means for normally urging said locking member into such out-of-alinement relationship.

10. In a clutch, in combination, a driving spur gearlike member, a driven member having a driven spur gearlike element and a locking spur gearlike element axially spaced thereon, said two spur gearlike elements on said driven member having the same pitch diameter and number of teeth as the driving gearlike member, an internally toothed clutch meshing with the driving gearlike member and said driven spur gearlike element, said clutch being movable axially along the driven member to disengage from the driving gearlike member, and a toothed locking ring movable axially with the clutch and having angular movement relatively thereto, the teeth of said locking ring being movable into and out of meshing alinement with the teeth of the locking spur gearlike element to permit movement of the locking ring along the driven member to positions adjacent either face of said locking spur gearlike element.

CURTIS S. CRAFTS.

REFERENCES CITED

The following references are of record in the file of this patent:

UNITED STATES PATENTS

| Number | Name | Date |
|---|---|---|
| 243,634 | Bellers et al. | June 28, 1881 |
| 1,010,748 | Greaves | Dec. 5, 1911 |
| 1,686,989 | Ridley | Oct. 9, 1928 |
| 1,961,426 | Morgan | June 5, 1934 |
| 2,070,140 | Peterson et al. | Feb. 9, 1937 |
| 2,101,897 | Coultas | Dec. 14, 1937 |
| 2,248,134 | Snow | July 8, 1941 |
| 2,313,717 | Armantrout | Mar. 16, 1943 |
| 2,493,059 | Crafts | Jan. 3, 1950 |

FOREIGN PATENTS

| Number | Country | Date |
|---|---|---|
| 266,563 | Great Britain | Mar. 3, 1927 |
| 418,328 | Great Britain | Oct. 23, 1934 |